United States Patent
Lenz

(10) Patent No.: US 9,593,937 B2
(45) Date of Patent: Mar. 14, 2017

(54) METHOD FOR DETERMINING THE ALIGNMENT OF A LASER LIGHT BEAM REFERRED TO AN AXIS OF ROTATION OF A DEVICE THAT IS ROTATABLE AROUND THE AXIS OF ROTATION AND LASER LIGHT DETECTION DEVICE

(71) Applicant: Prüftechnik Dieter Busch AG, Ismaning (DE)

(72) Inventor: Johann Lenz, Ismaning (DE)

(73) Assignee: PRÜFTECHNIK DIETER BUSCH AG, Ismaning (DE)

( * ) Notice: Subject to any disclaimer, the term of this patent is extended or adjusted under 35 U.S.C. 154(b) by 51 days.

(21) Appl. No.: 14/788,661

(22) Filed: Jun. 30, 2015

(65) Prior Publication Data
US 2016/0003608 A1    Jan. 7, 2016

(51) Int. Cl.
*G01B 11/14*    (2006.01)
*G01B 11/00*    (2006.01)
*G01B 11/27*    (2006.01)

(52) U.S. Cl.
CPC .......... *G01B 11/005* (2013.01); *G01B 11/272* (2013.01)

(58) Field of Classification Search
CPC ... G01B 11/005; G01B 11/272; A23C 11/103; A47J 31/0678; A47J 31/3695
USPC .................................................. 356/614–624
See application file for complete search history.

(56) References Cited

U.S. PATENT DOCUMENTS

| | | |
|---|---|---|
| 3,923,402 A | 12/1975 | Turcotte |
| 4,298,281 A | 11/1981 | Schave |
| 5,026,998 A | 6/1991 | Hoelzl |

FOREIGN PATENT DOCUMENTS

| | | |
|---|---|---|
| EP | 0367814 A1 | 5/1990 |
| EP | 0 518 572 A2 | 12/1992 |
| EP | 0 474 799 B1 | 10/1994 |

*Primary Examiner* — Tri T Ton
(74) *Attorney, Agent, or Firm* — Millman IP Inc.

(57) ABSTRACT

The invention relates to a method for determining the alignment of a laser light beam referred to an axis of rotation of a device that is rotatable around the axis of rotation, wherein the alignment is determined by means of a laser light detector device, and wherein the method comprises the steps A to D. Moreover, the invention relates to a laser light detection device.

9 Claims, 5 Drawing Sheets

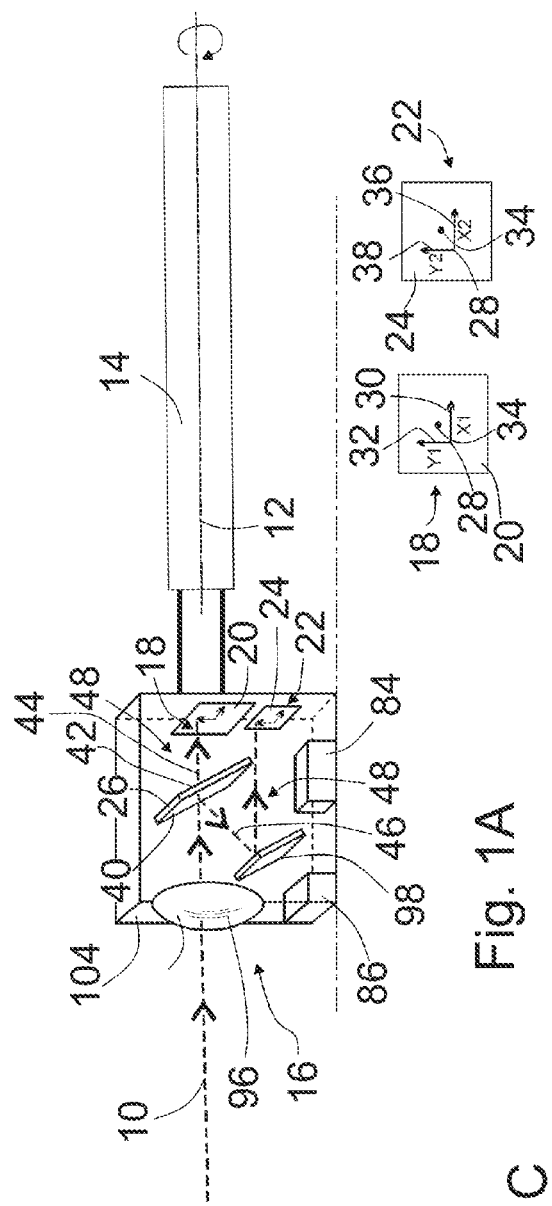
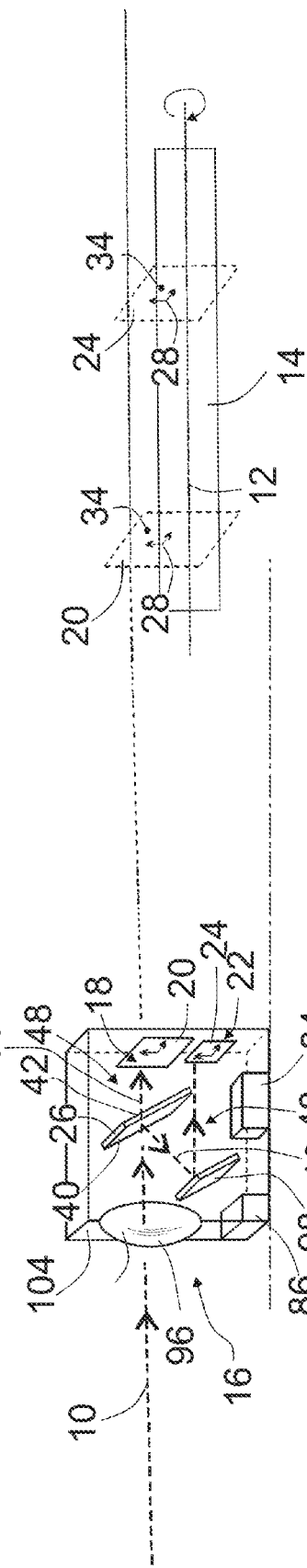
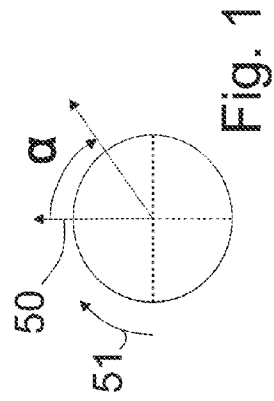

METHOD FOR DETERMINING THE ALIGNMENT OF A LASER LIGHT BEAM REFERRED TO AN AXIS OF ROTATION OF A DEVICE THAT IS ROTATABLE AROUND THE AXIS OF ROTATION AND LASER LIGHT DETECTION DEVICE

BACKGROUND OF THE INVENTION

The present invention relates to a method for determining the alignment of a laser light beam referred to an axis of rotation of a device that is rotatable around the axis of rotation, wherein the alignment is ascertained by means of a laser light detection device, and the laser light detection device.

Known methods and laser light detection devices for determining the alignment of a laser light beam referred to an axis of rotation of a device which can rotate about the latter, such as a roller or a shaft, are used in particular to determine the alignment of the axis of rotation in relation to a reference direction or a reference axis which can also run parallel to the laser light beam or be aligned with it. In particular, on the basis of such methods, one can determine, for example, the alignment of the rolls of a rolling mill with each other, in order to identify any deviations from a desired parallel orientation of the axes of rotation of the rolls. Thus, e.g., from EP 0 518 572 A2, it is known how to install or arrange at least one laser light sensor on the periphery of at least one of the rolls in a layout composed of several rolls, or with a radial spacing of the rolls, or with a distance from the roll measured perpendicular to the axis of rotation. Such an arrangement of laser light sensors on a roller or shaft is also known from DE 39 11 370 A1. However, there are limits to the determination of the alignment of a laser light beam in this arrangement, when such is not possible due to particular structural features. One can imagine, e.g., a rolling stand whose rolls are surrounded by a protective covering so that the covering surface area of the rolls is not accessible from outside the rolling stand. Moreover, there are rolling stands—such as in the paper industry—that are partly or totally housed or whose rolls are set very close together or whose roll surface is not suited to the mounting of the laser light sensors, e.g., due to a conical configuration of the rolls or due to a rubberized or closed or too small a configuration of the roll surface.

Other methods for determining the alignment of devices based on lasers and/or detectors are known, for example, from DE 10 2008 035 480 A1, DE 101 09 462 A1, DE 10 2009 026 836 A1, DE 10 2011 078 623 A1, DE 10 2007 041 750 A1, EP 0 474 799 B1, U.S. Pat. No. 3,923,402 and DE 38 14 466 A1. A method for determining the alignment of mechanisms on the basis of a measuring device and a target mark is known from DE 10 2004 004 412 A1.

PROBLEM TO BE SOLVED

A problem of the invention is to indicate a method for determining the alignment of a laser light beam referred to an axis of rotation of a device and to indicate a laser light detection device with which the alignment can be reliably determined even when there is only limited accessibility to the device.

The problem is solved according to the invention by a method with the features of claim 1 and with a laser light detection device with the features of claim 7.

In the method of the invention for determining the alignment of a laser light beam referred to an axis of rotation of a device that is rotatable or turnable around the axis of rotation, the alignment is determined by means of a laser light detection device.

The laser light detection device comprises a first laser light sensor with a first planar measuring field, a second laser light sensor with a second planar measuring field, and a beam splitter.

The first measuring field has a coordinate system with an X1 coordinate axis and a Y1 coordinate axis perpendicular to the X1 coordinate axis or the plane of the first measuring field is laid out by an X1 coordinate axis and a Y1 coordinate axis perpendicular to the X1 coordinate axis of a coordinate system, wherein the first laser light sensor is disposed to detect on the first measuring field the X1 coordinate and Y1 coordinate of a laser light spot of a laser light beam impinging on the first measuring field and wherein the first laser light sensor is disposed to detect on the first measuring field the X1 coordinate and Y1 coordinate of a laser light spot which is formed on the first measuring field upon irradiation of the first measuring field with a laser light beam.

The second measuring field has a coordinate system with an X2 coordinate axis and a Y2 coordinate axis perpendicular to the X2 coordinate axis or the plane of the second measuring field is laid out by an X2 coordinate axis and a Y2 coordinate axis perpendicular to the X2 coordinate axis of a coordinate system, wherein the second laser light sensor is disposed to detect on the second measuring field the X2 coordinate and Y2 coordinate of a laser light spot of a laser light beam impinging on the second measuring field and wherein the second laser light sensor is disposed to detect on the second measuring field the X2 coordinate and Y2 coordinate of a laser light spot which is formed on the second measuring field upon irradiation of the second measuring field with a laser light beam.

The Y2 coordinate axis of the second measuring field is oriented or aligned parallel to the Y1 coordinate axis of the first measuring field and/or the X2 coordinate axis of the second measuring field is oriented or aligned parallel to the X1 coordinate axis of the first measuring field.

The beam splitter has a planar entry surface or a planar incoming radiation surface and an exit surface parallel to this, wherein the entry surface is aligned parallel to the Y1 coordinate axis or X1 coordinate axis.

The beam splitter splits a laser light beam impinging on the planar entry surface or a laser light beam directed in relation to the first measuring field and impinging on the planar entry surface into a first partial beam, which passes through the beam splitter, and a second partial beam produced by reflection of a part of the laser light beam on the entry surface.

The optical path of the first partial beam emerging from the beam splitter and the optical path of the second partial beam emerging from the bear splitter—or the predetermined optical path of the first partial beam and the second partial beam emerging from the beam splitter—are configured such or chosen such or are such that the first partial beam impinges on the first measuring field and the second partial beam impinges on the second measuring field and such that the optical path of the first partial beam up to the first measuring field is shorter than the optical path of the second partial beam up to the second measuring field. This configuration of the optical paths can be accomplished in known manner by suitable selection of the positions of the first and second measuring fields in relation to the beam splitter and optionally by suitable selection of the position and configuration of at least one deflection means optionally used, such as a mirror, in relation to the beam splitter.

More preferably, the first and second measuring fields or the coordinate system of the first measuring field and the second measuring field in one embodiment are arranged such referred to the beam splitter that, when a laser light beam aligned parallel to a normal line on the first measuring field or when a laser light beam aligned with this normal line (i.e., a vector or a line which is oriented normally or perpendicularly to the first measuring field) impinges on the entry surface of the beam splitter, the first partial beam forms on the first measuring field a laser light spot whose X1 coordinate corresponds to the X2 coordinate of the laser light spot of the second partial beam on the second measuring surface and whose Y1 coordinate corresponds to the Y2 coordinate of the laser light spot of the second partial beam on the second measuring field or corresponds to the Y2 coordinate of the laser light spot of the second partial beam which is formed on the second measuring field upon irradiation with the second partial beam. In order to accomplish this—in addition to a possibly required corresponding adapting of the position of the coordinate axes of the coordinate systems of the two measuring fields to each other—e.g., a laser light beam serving as an orienting laser beam, being aligned parallel to the normal line or aligned with it, can impinge or be beamed onto the entry surface of the beam splitter and the position of the laser light spot of the first partial beam forming on the first measuring field and the position of the laser light spot of the second partial beam forming on the second measuring field are defined each time as the center of the coordinate system or assigned to the center or the positions of the coordinate system of the first measuring field and the second measuring field can be chosen or moved on the first measuring field and second measuring field for this purpose so that the laser light spot of the first partial beam is located at the center of the coordinate system of the first measuring field and the laser light spot of the second partial beam is found at the center of the coordinate system of the second measuring field.

Thanks to the above arrangement of the first and second measuring fields or the coordinate system of the first measuring field and the second measuring field referred to the beam splitter, the effort and expense of determining the alignment of the laser light beam referred to the axis of rotation on the basis of the detected coordinates and angle of rotation in step D can be effectively reduced, since an offset of the centers does not need to be included as a correction value in the determination.

The device able to rotate about the axis of rotation can be, in particular, a shaft or a roll, for example, wherein on the basis of alignments of the axes of rotation of shafts or rolls ascertained by the method of the invention referred to a laser light beam or laser beam, one can also determine, in particular, the alignment of rolls or shafts to one another in a device comprising several rolls or shafts, such as a rolling mill, in order to be able to advantageously ascertain, for example, and possibly correct any wrong alignments of the rolls or shafts to one another.

The method comprises the following steps:

(A) Rotationally fixed connecting of the laser light detection device to the device, wherein the laser light detection device is connected to the device in a rotationally fixed manner such that the first measuring field is remote from or arranged at a distance from the device along the axis of rotation or along a line parallel to this, such that the second measuring field is arranged remote (distanced) from the device along the axis of rotation or along a line parallel to this, and such that the X1 coordinate axis and the Y1 coordinate axis of the first measuring field are pointed or oriented essentially perpendicular to the axis of rotation of the device, (B) Irradiating the entry surface of the beam splitter with the laser light beam, wherein during the irradiating of the entry surface the device is rotated, starting from a predetermined initial rotational position, in a predetermined direction of rotation through a predetermined angular dimension.

(C) Detecting the X1 coordinates and Y1 coordinates of the laser light spot of the first partial beam on the first measuring field by the first laser light sensor and the X2 coordinates and Y2 coordinates of the laser light spot of the second partial beam on the second measuring field by the second laser light sensor in at least five different rotational positions of the device, these positions being assumed during the rotation according to step (B), and detecting the angle of rotation by which the device is turned in each of the different rotational positions compared to the initial rotational position, and (D) Determining the alignment of the laser light beam referred to the axis of rotation of the device on the basis of the angle of rotation detected for each rotational position and the Y1 coordinates and Y2 coordinates detected, or on the basis of the angle of rotation detected for each rotational position and the X1 coordinates and X2 coordinates detected.

The method according to the invention is distinguished, in particular, in that in step A the laser light detection device is connected to the device in a rotationally fixed manner such that the first measuring field is remote from or arranged at a distance from the device along the axis of rotation or along a line parallel to this, and such that the second measuring field is also remote from or arranged at a distance from the device along the axis of rotation or along a line parallel to this. Due to this spacing or distance of the two measuring fields from the device, the alignment of the laser light beam referred to the axis of rotation of the device can then also be reliably determined, even when there is only a limited access to the device.

That the alignment of the laser light beam can also be reliably determined by means of the laser light detection device, even when the two measuring fields are arranged remote from or arranged at a distance from the device in the above-described manner, is a consequence of the circumstance that by providing the beam splitter and the first and second partial beams provided by it, a laser light detection device is offered, which enables an alignment determination similar to that of a known arrangement, e.g., from DE 39 11 307 A1, in which the two measuring fields are arranged in succession along a line on the device which is parallel to the axis of rotation. Due to the laser light detection device, a measurement arrangement can be realized in which the two measuring fields are arranged virtually in succession along the axis of rotation on the device, the term "virtually" meaning an imaginary condition which is not physically present, yet existing in its functionality or effect.

In particular, due to the separation or distance of the two measuring fields provided by the rotatable device, a monitoring of the alignment of the axis of rotation of a roll or the axes of rotation of several rolls during their operation can also be realized advantageously in a simple and practical manner, as a kind of "live" monitoring.

Measurement errors due to irregularities on the roll surfaces, which may occur in the known solutions, play no role here, due to the provided distance or separation of the two measuring fields.

In particular, by providing one or more deflection means, such as, e.g., a mirror, one can also provide in little space a large difference in the optical paths of the partial beams emerging from the beam splitter, which is necessary for a reliable or precise determination of the alignment in the laser light detection device. Preferably, the laser light detection device can comprise a housing in which the two measuring fields and the beam splitter are arranged, wherein the housing can be formed, e.g., with a maximum dimension of approx. 100 mm, for example, so that the method can also advantageously be carried out with no problem in a small space.

The essentially perpendicular orientation of the X1 coordinate axis and the Y1 coordinate axis of the first measuring field to the axis of rotation of the device (see step A) is meant here to be a deviation from the perfect perpendicular orientation, which is less than 5 degrees, preferably less than 1 degree.

That two axes have a perpendicular or essentially perpendicular orientation or alignment to each other, of course, does not require that these axes must always intersect. When the two axes do not intersect, they form a common point of intersection by a translatory displacement and then can include a right or essentially right angle.

In step B, there occurs the irradiating of the entry surface of the beam splitter with the laser light beam or the irradiating of the entry surface of the beam splitter with the laser light beam pointing toward the first measuring field and the rotation of the device, wherein, during the irradiating of the entry surface, the device is rotated through a predetermined angular dimension, starting from a predetermined initial rotational position in a predetermined direction of rotation. The predetermined angular dimension can preferably be at least 90 degrees, in order to determine the alignment very precisely by providing the largest possible number of rotational positions occupied, in which each time, according to step (C), the X1 coordinates and Y1 coordinates of the laser light spot of the first partial beam on the first measuring field, and the X2 coordinates and Y2 coordinates of the laser light spot of the second partial beam on the second measuring field are detected, wherein the number of rotational positions more preferably can be greater than five, most preferably greater than ten or twenty or fifty.

However, also advantageously only at least five rotational positions can suffice (see step C), since during the rotating of the device through 360 degrees, the closed trajectories described by the laser light spots of the two partial beams on the first and second measuring fields each are configured as ellipses or circles, depending on the direction of incidence of the laser light beam on the entry surface of the beam splitter, and an ellipse is established by at least five points and a circle by at least three points. Therefore, the respective ellipse can be determined especially by curve fitting to at least five detected positions of the laser light spot on the first measuring field and by curve fitting on at least five detected positions of the laser light spot on the second measuring field, or the respective circle as a special case of an ellipse by curve fitting. On the basis of the thus determined closed trajectories on the first and the second measuring fields, in step D the alignment of the laser light beam referred to the axis of rotation of the device can then be determined in combination with the rotational angles detected for each rotational position, wherein, in particular, e.g., the centers or midpoints of the two closed trajectories can be joined together by a connecting line or imaginary connecting line for this, and the two measuring fields are to be conceived as being arranged in succession along the axis of rotation (see also the preceding statements on the virtual consecutive arrangement), wherein the distance between the measuring fields corresponds to the difference between the optical paths of the first and second partial beam emerging from the beam splitter, i.e., the optical path of the second partial beams up to the second measuring field minus the optical path of the first partial beam up to the first measuring field. The alignment of these connection lines referred to the laser light beam—whose position, e.g., within a predetermined three-dimensional coordinate system or spatial three-dimensional coordinate system can be known—is identical to the alignment of the axis of rotation referred to this laser beam, since the connection line is a line flush with the axis of rotation, or because the connection line is a line extending the axis of rotation. Each midpoint of the two closed trajectories corresponds here to a puncture point or imaginary puncture point of a line extending the axis of rotation through the respective measuring field, or each midpoint of the two closed trajectories is identical or essentially identical here to a puncture point or imaginary puncture point of a line extending the axis of rotation through the respective measuring field. To realize this kind of determination of the alignment, it is necessary for the first and second measuring fields or the system of coordinates of the first measuring field and the second measuring field according to one embodiment (see also the corresponding statements above) to be arranged in relation to the beam splitter such that, when a laser light beam aligned parallel to a normal line to the first measuring field or when a laser light beam flush with this normal line impinges on the entry surface of the beam splitter, the first partial beam forms a laser light spot on the first measuring field whose X1 coordinate corresponds to the X2 coordinate of the laser light spot of the second partial beam on the second measuring field, and whose Y1 coordinate corresponds to the Y2 coordinate of the laser light spot of the second partial beam on the second measuring field or to the Y2 coordinate of the laser light spot of the second partial beam, which is formed on the second measuring field when irradiated with the second partial beam.

But if the position of the laser light beam is such that it is flush or completely flush with the axis of rotation of the device, only a single laser light spot is formed on the two measuring fields, whose coordinates do not depend on the rotational position or the angle of rotation or whose coordinates or whose position on the two measuring fields does/do not change upon the rotation in step B. Moreover, the position of the laser light beam can also be such that it impinges on a puncture point or imaginary puncture point of a line extending the axis of rotation through the first measuring field, so that such a single laser light spot is formed only on the first measuring field, whose coordinates on the first measuring field do not depend on the rotational position or the angle of rotation, while the laser light spot of the second partial beam on the second measuring field can describe an ellipse or a circle upon rotation or turning through 360 degrees.

In step D there occurs the determination of the alignment of the laser light beam referred to the axis of rotation of the device on the basis of the angle of rotation detected for each rotational position and the detected Y1 coordinates and Y2 coordinates, or on the basis of the angle of rotation detected for each rotational position and the detected X1 coordinates and X2 coordinates. For this, more preferably the Y1 coordinates (or X1 coordinates) are plotted as a function of the measured angle of rotation against the difference Y1-Y2 formed from the Y1 coordinates and Y2 coordinates (or against the difference X1-X2 formed from the X1 coordinates and X2 coordinates)—which is likewise represented as a function of the measured angle of rotation—and a closed trajectory in the form of a circle or an ellipse is determined by curve fitting to the plotted coordinates. By means of these determined trajectories, the alignment of the laser light beam referred to the axis of rotation can then be easily determined or derived. This additional form of determination also requires that the first and second measuring fields or that the coordinate system of the first measuring field and the second measuring field is arranged in one embodiment (see also above) in relation to the beam splitter so that when a laser light beam aligned parallel to a normal line to the first measuring field, or when a laser light beam flush with this normal line impinges on the entry surface of the beam splitter, the first partial beam forms a laser light spot on the first measuring field whose X1 coordinate corresponds to the X2 coordinate of the laser light spot of the second partial beam on the second measuring field and whose Y1 coordinate corresponds to the Y2 coordinate of the laser light spot of the second partial beam on the second measuring field, or corresponds to the Y2 coordinate of the laser light spot of the second partial beam, which is formed on the second measuring field upon irradiating with the second partial beam. Preferably, in this embodiment, the entry surface of the beam splitter is oriented inclined at an angle of 45° with respect to the first measuring field.

However, the determination of the alignment on the basis of the above types and forms of the determination is not limited to these. Essentially, the alignment can be determined on the basis of the angle of rotation detected for each rotational position and the Y1 coordinates and Y2 coordinates detected, or on the basis of the angle of rotation detected for each rotational position and the X1 coordinates and X2 coordinates detected in another manner known to the person skilled in the art, since the angle of rotation detected for each rotational position together with the detected Y1 coordinates and Y2 coordinates or together with the detected X1 coordinates and X2 coordinates constitute information that is suitable for the determination of the alignment of the laser light beam referred to the axis of rotation of the device. The alignment that can be determined by the method, in particular, is not dependent on the parallel offset of the first partial beam with respect to the laser light beam impinging on the entry surface of the beam splitter, i.e., the parallel offset which is caused in known manner by refraction when passing through the beam splitter, or refraction of light.

In the preceding and also in the following text, the term alignment is generally not meant as the position of objects (an object can be, e.g., an axis or a laser light beam) in relation to each other, since the term "position" also includes information as to the spacing of the objects. The term alignment as distinguished from the term position only means the alignment or inclination of the objects in relation to each other (i.e., without information as to the spacing), particularly including also the parallel inclination or parallel alignment.

In the preceding and also in the following text, in particular, the term alignment does not mean the position of the axis of rotation in relation to the laser light beam or the position of the laser light beams or axes of rotation in relation to each other, since the term "position" also includes information on the spacing of the axis of rotation from the laser light beam or the spacing of the laser light beams or axes of rotation from one another. The term alignment as distinguished from the term position only means the alignment or inclination of the laser light beam in relation to the axis of rotation or the alignment or inclination of the laser light beams in relation to one another or the alignment or inclination of the axes of rotation to one another (thus, without information on the spacing), particularly including also the parallel inclination or parallel alignment. To quantify the alignment or inclination, the laser light beam can be brought by a translation or imaginary or constructed translation of the axis of rotation and/or the laser light beam into an intersection—insofar as the laser light beam does not already form a common point of intersection with the axis of rotation—and the magnitude of the angle of intersection or angle of inclination can be used or drawn on as a measure to quantify the alignment. The same also applies to the quantifying of the laser light beams or axes of rotation in relation to each other.

The angle of rotation provided in step C can be detected in a way known to the person skilled in the art by measuring by means of a measurement instrument provided on the laser light detection device or on the rotatable device for measuring an angle of rotation, especially an inclinometer, which measures or detects the angle of rotation during the rotation, so that each position of the laser light spot of the first partial beam and the second partial beam as defined by the X1 coordinates, Y1 coordinates, X2 coordinates and Y2 coordinates can be associated with an angle of rotation through which the device is rotated compared to the initial rotational position or starting rotational position.

When the device is a roll or a shaft and the roll or the shaft has a threaded borehole at one end face, a screw connection between the laser light detection device and the roll or the shaft can preferably be produced for the rotationally fixed connection according to step A via the threaded borehole. With a screw connection, a very stable and rotationally fixed connection can be created between the laser light detection device and the device rotatable around the axis of rotation. Such a connection is especially advantageous when a threaded borehole is already present on the end face of the roll or shaft, e.g., which is provided for another application, and therefore can also be used for determining the alignment by means of the method according to the invention.

When the device is a roll or a shaft and when the roll or the shaft is magnetic at least in regions at least on the covering surface area, the laser light detection device can have preferably a holding device with at least one magnetically configured holding means for the rotationally fixed connection according to step A and the holding device can be connected in a rotationally fixed manner by magnetic force by bringing the holding means into contact with the covering surface area of the roll or shaft. By providing the holding device, the alignment can also be reliably determined in particular when the end face of the roll or the shaft is not accessible, e.g., due to being housed.

The laser light sensors can be any given laser light sensor provided with a planar measuring field. Especially preferred is a laser light sensor having a plurality of line sensors to form the measuring field. The X1 coordinates and Y1 coordinates and X2 coordinates and Y2 coordinates detected by the laser light sensor can be introduced in the form of analog or digital signals via a signal transmission pathway—including wireless—into an evaluating device, such as a computer, e.g., in the form of a laptop or tablet, for further evaluation. In particular, the laser light sensor can be a PSD (position sensitive device) sensor. The X1 coordinate and Y1 coordinate or X2 coordinate and Y2 coordinate of the laser light spot mentioned above and hereinafter, of course, involve each time the coordinates of a point, even though the laser light spot always has a two-dimensional extent on the respective measuring field. Thus, the X1 coordinates and Y1 coordinates or X2 coordinates and Y2 coordinates of the laser light spot in the above and the following text always mean the coordinates of a point that can be determined from the configuration of the surface and/or the brightness distribution of the laser light spot on the surface or the measuring field. In particular, the point can be, e.g., the center of gravity of the area of the laser light spot. The determination or calculation of the point is preferably carried out by means of a computing device of the laser light detection device, such as, e.g., a computer, on the basis of the digital and/or analog signals associated with the particular laser light spot or generated or produced by it, these signals being emitted by the laser light sensor. Insofar as the laser light sensor is a PSD sensor, the center of gravity of the area can be calculated, e.g., in known way on the basis of suitable resistance measurements at the corners of the sensor or the corners of the field. When calculating the center of gravity, an area on the respective measuring field is then evaluated. This calculation on a PSD sensor can make it possible to ascertain movements of a laser light spot on the measuring field in the µm range, so that the size of the laser light spot plays a lesser role in the case of a PSD sensor.

Step B is performed after step A and step C is performed during step B. Step D follows step C.

The invention also relates to a method for determining the alignment of a plurality of devices in relation to each other, being spaced apart and each able to rotate about an axis of rotation, wherein the method comprises the following steps:

(I) Determining the alignment of the axis of rotation of a first device referred to a first laser light beam by means of an above method according to the invention, (II) Providing at least one second laser light beam, wherein the position of the second laser light beam differs from that of the first laser light beam, (III) Determining the alignment of the axis of rotation of at least one second device referred to the second laser light beam by means of an above method according to the invention, (IV) Determining the alignment of the second laser light beam in relation to the first laser light beam, and (V) Determining the alignment of the axis of rotation of the second device referred to the first laser light beam on the basis of the alignment determined in step (IV) and the alignment determined in step (III) and determining the alignment of the axis of rotation of the first device referred to the axis of rotation of the second device on the basis of the determined alignment of the axis of rotation of the second device referred to the first laser light beam and the alignment determined in step (I).

With this method, on the basis of the above method for determining the alignment of a laser light beam referred to an axis of rotation of a device, one can advantageously determine the alignment of a plurality or at least two devices to each other, which are spaced apart and each of which can rotate about an axis of rotation. In particular, with this method one can advantageously determine, e.g., the alignment of rolls of a rolling mill in relation to each other and check them for parallelism, in order to ascertain deviations from a desired parallel alignment of the axes of rotation of the rolls to each other and carry out suitable correction measures.

The alignment of the second laser light beam in relation to the first laser light beam can be determined in a known way, i.e., for example by determining the alignment by means of suitable laser light sensors and/or on the basis of emission directions of the laser light beams chosen for the particular laser or lasers used in each case.

The designating of the steps as I, II, III, IV and V is not meant to imply any association, or any exclusive association, with a temporal sequence. Thus, step III can be performed after step I or step I can also be performed after step III. Step II is performed before step III. Step IV can be performed after step II and before step III. Step V is finally performed as the last step. Preferably, step V is performed or undertaken after step IV, step IV after step III, step III after step II, and step II after step I.

Preferably, the first and the at least second laser light beams are generated by the same laser light source, the position of the laser light source and/or the emission direction of the laser light source being changed to provide laser light beams with positions differing from each other. By using a single laser light source, the laser light beams can be provided in simple and practical manner.

In one preferred embodiment of the method for determining the alignment of a plurality of devices in relation to each other, the laser light source divides a horizontally aligned laser light base beam (as a laser light base beam aligned parallel to the floor or the ground surface) into a horizontally aligned partial beam (as a partial beam aligned parallel to the floor or the ground surface) and another partial beam that is aligned perpendicular to the horizontally aligned partial beam, wherein the laser light source moreover is designed to rotate the additional partial beam in a vertically extending plane, and wherein the first laser light beam is a first horizontally aligned partial beam of the laser light source, and wherein the second laser light beam is a second horizontally aligned partial beam of the laser light source, or wherein the first laser light beam and the second laser light beam are horizontally aligned partial beams of the laser light source, and wherein before step (I) a third laser light sensor with a third planar measuring field and a fourth laser light sensor with a fourth planar measuring field with a predetermined spacing of the measuring fields from each other are arranged in predetermined positions, wherein the third measuring field has a Y3 coordinate axis and the fourth measuring field a Y4 coordinate axis or wherein the plane of the third measuring field extends along a Y3 coordinate axis situated in the plane and wherein the plane of the fourth measuring field extends along a Y4 coordinate axis situated in the plane, wherein the third and the fourth measuring fields are arranged in the predetermined positions such that the Y3 coordinate axis and Y4 coordinate axis are parallel to each other and extend horizontally, wherein the positions of the third and fourth measuring fields are moreover chosen such that the additional partial beam rotatable in the vertical plane in steps (I) and (III) can impinge upon the third and the fourth measuring fields, and wherein in step (IV), for determining the alignment of the second laser light beam in relation to the first laser light beam in steps (I) and (III), the Y3 coordinates and Y4 coordinates of at least one laser light spot of the additional partial beam impinging on the third and fourth measuring fields are additionally detected—or the Y3 coordinates and Y4 coordinates of at least one laser light spot, which forms on the third and fourth measuring fields of the additional partial beam impinging on the third and fourth measuring fields are additionally detected—and on this basis the alignment of the second laser light beam in relation to the first laser light beam is determined or wherein in step (IV), for the determining of the alignment of the second laser light beam in relation to the first laser light beam in steps (I) and (III), the Y3 coordinate of at least one laser light spot of the additional partial beam impinging on the third and fourth measuring field is additionally detected by the third laser light sensor, and the Y4 coordinate of at least one laser light spot of the additional partial beam impinging on the fourth measuring field is additionally detected by the fourth laser light sensor, and on the basis of the Y3 coordinate and the Y4 coordinate, the alignment of the second laser light beam in relation to the first laser light beam is determined.

For the generating or providing of the additional partial beam which can rotate in a vertically extending plane, the laser light source can be constructed in the form of a rotation laser and have a rotatable deflection prism. Inclination compensators, for example, can be provided in order to provide the horizontally extending partial beam.

By means of this preferred embodiment, the alignment of the axes of rotation of the rolls of a horizontally or essentially horizontally aligned rolling mill to each other can be determined exactly, since a first laser light beam in the form of a first horizontally aligned partial beam and at least one second laser light beam in the form of at least one second horizontally aligned partial beam are used for this, whereby their alignment to each other can be determined in simple and precise manner in the above described way by means of the additional partial beam able to rotate in the vertical plane and the third and fourth laser light sensor.

The third laser light sensor is designed to detect the Y3 coordinate of a laser light spot of a laser light beam impinging on the measuring field. The same also holds for the fourth laser light sensor, which is thus also designed to detect on the measuring field the Y4 coordinate of a laser light spot of a laser light beam impinging on the measuring field. The third and fourth laser light sensors can be any given laser light sensor having a planar measuring field in the manner already described above. More preferably, it is a laser light sensor having a plurality of line sensors or even only one line sensor for formation of the measuring field, since only the detection in a Y3 direction or Y4 direction, i.e., in only one spatial direction, is provided here.

In step (IV), on the basis of the detected Y3 coordinates and Y4 coordinates of at least one laser light spot of the additional partial beam impinging on the third and fourth measuring fields, the alignment of the second laser light beam in relation to the first laser light beam is determined. Since the distance from the third measuring field to the fourth measuring field is known as a predetermined distance and the additional partial beam is perpendicular to the first or second laser light beam produced in the form of the horizontally aligned partial beam, the alignment of the second laser light beam in relation to the first laser light beam can be determined on the basis of simple geometrical relations, e.g., also via the tangent function.

The laser light detection device for determining the alignment of a laser light beam referred to an axis of rotation of a device that is rotatable around the axis of rotation comprises a first laser light sensor with a first planar measuring field, a second laser light sensor with a second planar measuring field, and a beam splitter.

The first measuring field of the laser light detection device has a coordinate system with an X1 coordinate axis and a Y1 coordinate axis perpendicular to the X1 coordinate axis, wherein the first laser light sensor is disposed to detect on the first measuring field the X1 coordinate and Y1 coordinate of a laser light spot of a laser light beam impinging on the first measuring field.

The second measuring field of the laser light detection device has a coordinate system with an X2 coordinate axis and a Y2 coordinate axis perpendicular to the X2 coordinate axis, wherein the second laser light sensor is disposed to detect on the second measuring field the X2 coordinate and Y2 coordinate of a laser light spot of a laser light beam impinging on the second measuring field.

The Y2 coordinate axis of the second measuring field is oriented parallel to the Y1 coordinate axis of the first measuring field and/or the X2 coordinate axis of the second measuring field is oriented parallel to the X1 coordinate axis of the first measuring field, whereby the beam splitter has a planar entry surface and an exit surface parallel to this, whereby the entry surface is aligned parallel to the Y1 coordinate axis or X1 coordinate axis, wherein the beam splitter splits a laser light beam impinging on the planar entry surface or a laser light beam directed at the first measuring field and impinging on the planar entry surface into a first partial beam, which passes through the beam splitter, and a second partial beam produced by reflection of a part of the laser light beam on the entry surface.

The optical path of the first partial beam emerging from the beam splitter and of the second partial beam are configured such that the first partial beam impinges on the first measuring field and the second partial beam impinges on the second measuring field, and such that the optical path of the first partial beam up to the first measuring field is shorter than the optical path of the second partial beam up to the second measuring field, or such that the travel time of the first partial beam up to the first measuring field is shorter than the travel time of the second partial beam up to the second measuring field.

The laser light detection device can be connected to the device in a rotationally fixed manner, so that the first measuring field is arranged at a distance from the device along the axis of rotation or along a line parallel to this, so that the second measuring field is arranged at a distance from the device along the axis of rotation or along a line parallel to this, and so that the X1 coordinate axis and the Y1 coordinate axis of the first measuring field are aligned or oriented essentially perpendicular to the axis of rotation of the device.

The arrangement of the first and second measuring fields at a distance from the device can be accomplished, e.g., with suitable spacing means, which can realize the separation or spacing while preserving the rotationally fixed connection of the device to the laser light detection device.

The laser light detection device moreover has an evaluation unit and a measurement instrument for measuring an angle of rotation.

The evaluation unit is designed to determine the alignment of the laser light beam referred to the axis of rotation of the device on the basis of Y1 coordinates and Y2 coordinates or X1 coordinates and X2 coordinates of the laser light spot of the first and second partial beams, which are detected by the first laser light sensor and the second laser light sensor upon rotating the device in a predetermined direction of rotation through a predetermined angular dimension in at least five different rotational positions of the device, and on the basis of the angles of rotation by which the device is rotated in each of the different rotational positions compared to an initial rotational position, which are measured or measurable by the measurement instrument.

The measurement instrument for measuring an angle of rotation can comprise, in particular, an inclinometer, with which the angle of rotation can advantageously be measured very precisely.

Based on the principles explained above in connection with the method of the invention for determining the alignment of a laser light beam referred to an axis of rotation of a device, the alignment of the laser light beam referred to the axis of rotation of the device then can also be reliably determined by means of the above laser light detection device, even when there is only limited accessibility to the device.

Preferably, in order to produce a rotationally fixed connection to a device configured as a shaft or a roll, the laser light detection device is designed to produce a screw connection between the laser light detection device and the device via a threaded borehole, which is provided at one end face of the device, in keeping with the principles already explained above in connection with the method of the invention for determining the alignment of a laser light beam referred to an axis of rotation of a device.

More preferably, in order to produce a rotationally fixed connection to the device, the laser light detection device has a holding device with at least one magnetic holding means, so that the laser light detection device can be connected in a rotationally fixed manner by magnetic force by bringing the holding means into contact with the covering surface area of a device configured as a roll or a shaft, when the device rotatable about the axis of rotation is magnetic at least in regions on the covering surface area, in keeping with the principles explained above in connection with the method of the invention for determining the alignment of a laser light beam referred to an axis of rotation of a device.

BRIEF DESCRIPTION OF THE DRAWINGS

Exemplary embodiments of the invention shall be explained more closely below by means of the enclosed drawings. Shown in the drawings:

FIG. 1A, a schematic representation of an exemplary embodiment of a laser light detection device according to the invention, together with a roll FIG. 1B, an enlarged schematic representation of the measuring fields of the device of FIG. 1A FIG. 1C, a schematic representation of one end face of the roll of FIG. 1A FIG. 2, the laser light detection device of FIG. 1A, supplemented by a schematic sketch to illustrate the mode of operation of the laser light detection device, FIG. 3, a three-dimensional representation of another exemplary embodiment of a laser light detection device according to the invention, together with two rolls FIG. 4, a representation of a first and a second measuring field, FIG. 5, a representation of a closed trajectory in the form of an ellipse within a coordinate system FIG. 6A, a schematic front view of several rolling mills, FIG. 6B, a schematic representation to illustrate an exemplary embodiment of the method of the invention for determining the alignment of the axes of rotation of two devices in relation to each other, and FIG. 7A to C, schematic representations to illustrate another exemplary embodiment of the method of the invention for determining the alignment of axes of rotation of several devices in relation to each other.

Figure 3:
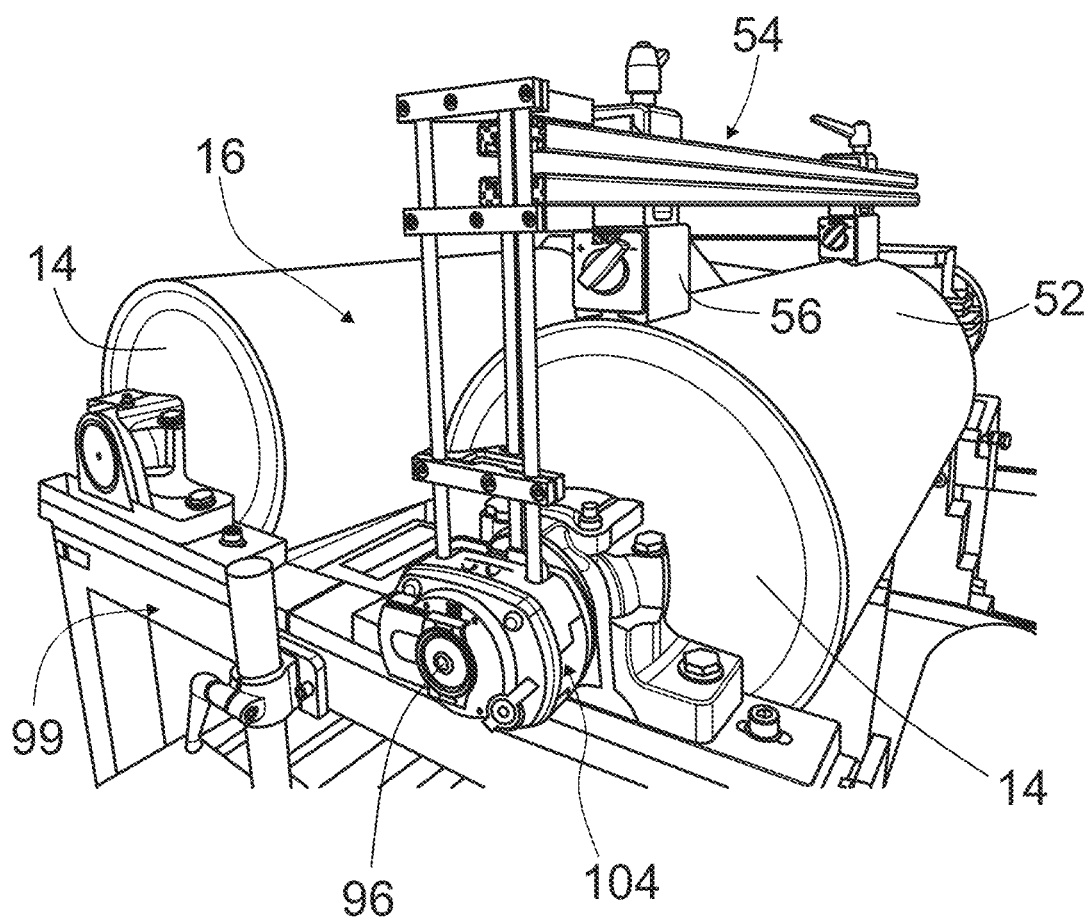

The laser light detection device 16 of FIG. 1A is a laser light detection device 16 for determining the alignment of a laser light beam 10 referred to an axis of rotation 12 of a device 14 in the form of a roll that is rotatable around the axis of rotation 12.

The laser light detection device 16 has a first laser light sensor 18 with a first planar measuring field 20, a second laser light sensor 22 with a second planar measuring field 24, and a beam splitter 26, the two measuring fields 20, 24 and the beam splitter 26 being arranged in a housing 104.

The first measuring field 20 (see also FIG. 1B) has a coordinate system 28 with an X1 coordinate axis 30 and a Y1 coordinate axis 32 perpendicular to the X1 coordinate axis 30, and the first laser light sensor 18 is disposed to detect on the first measuring field 20 the X1 coordinate and Y1 coordinate of a laser light spot 34 (see also FIG. 1B) of a laser light beam in the form of a first partial beam 44 impinging on the first measuring field 20.

The second measuring field 24 (see also FIG. 1B) has a coordinate system 28 with an X2 coordinate axis 36 and a Y2 coordinate axis 38 perpendicular to the X2 coordinate axis 36, and the second laser light sensor 22 is disposed to detect on the second measuring field 24 the X2 coordinate and Y2 coordinate of a laser light spot 34 (see also FIG. 1B) of a laser light beam in the form of a second partial beam 46 impinging on the second measuring field 24.

The Y2 coordinate axis 38 of the second measuring field 24 is oriented parallel to the Y1 coordinate axis 32 of the first measuring field 20 and the X2 coordinate axis 36 of the second measuring field 24 is oriented parallel to the X1 coordinate axis 30 of the first measuring field 20, so that the two measuring fields 20, 24, seen as a whole, have a parallel alignment to each other.

The beam splitter 26 has a planar entry surface 40 and an exit surface 42 parallel to this, and the entry surface 40 is aligned parallel to the X1 coordinate axis 30.

The beam splitter 26 splits a laser light beam 10 impinging through a lens 96 onto the planar entry surface 40 into a first partial beam 44, which passes through the beam splitter 26, and a second partial beam 46 produced by reflection of a part of the laser light beam 10 on the entry surface 40.

The optical path 48 of the first partial beam 44 emerging from the beam splitter 26 and the optical path 48 of the second partial beam 46 emerging from the beam splitter 26 are configured such or are such that the first partial beam 44 impinges on the first measuring field 20 and the second partial beam 46 impinges on the second measuring field 24, whereby the optical path of the second partial beam 46 is effectively lengthened by means of a deflection means in the form of a mirror 98, which is also arranged inside the housing 104, so that the optical path 48 of the first partial beam 44 up to the first measuring field 20 is shorter than the optical path of the second partial beam 46 up to the second measuring field 24.

Moreover, the first and second measuring fields 20, 24 are arranged referred to the beam splitter 26 in such a way that the coordinates of a laser light spot 34 of a first partial beam 44 on the first measuring field 20 aligned parallel to a normal line of the first measuring field 20 correspond to the coordinates of the laser light spot 34 of the second partial beam 46 on the second measuring field 24. In this way, the effort and expense for determining the alignment of the laser light beam 10 referred to the axis of rotation 12 on the basis of the detected coordinates and the angle of rotation detected for each rotational position can be effectively reduced.

The laser light detection device 16 is connected to the device 14 in a rotationally fixed manner such that the first measuring field 20 is arranged at a distance from the device 14 along the axis of rotation 12, such that the second measuring field 24 is arranged spaced or at a distance from the device 14 along a line parallel to the axis of rotation 12 (not shown), and such that the X1 coordinate axis 30 and the Y1 coordinate axis 32 of the first measuring field 20 are aligned or oriented essentially perpendicular to the axis of rotation 12 of the device 14. The connected state is symbolized by two broad parallel lines in FIG. 1A.

The laser light detection device 16 moreover has an evaluation unit 84 and a measurement instrument 86 for measuring an angle of rotation α (see also FIG. 1C).

The evaluation unit 84 is designed to determine the alignment of the laser light beam 10 referred to the axis of rotation 12 of the device 14 on the basis of Y1 coordinates and Y2 coordinates or X1 coordinates and X2 coordinates of the laser light spot 34 of the first and second partial beams 44, 46, which are detected by the first laser light sensor 18 and the second laser light sensor 22 upon rotating of the device 14 in a predetermined direction of rotation 51 through a predetermined angular dimension in at least five different rotational positions of the device 14, and on the basis of the angle of rotation α by which the device 14 is rotated in each of the different rotational positions compared to an initial rotational position 50, which are measurable by the measurement instrument 86 (see also FIG. 1C, where the initial rotational position 50 is symbolized by an arrow with solid line). For measuring of the angle of rotation α, the measurement instrument 86 has an inclinometer (not shown in detail). The coordinates are relayed for purposes of evaluation from the first and second laser light sensors 18, 22 to the evaluation unit 84 in the form of digital and/or analog signals. Moreover, the angles of rotation are relayed for purposes of evaluation from the measurement instrument 86 to the evaluation unit 84 in the form of digital and/or analog signals.

That the alignment of the laser light beam can then also be reliably determined by means of the laser light detection device 16, even when the two measuring fields 20, 24 are connected to the rotatable device 14 in a rotationally fixed manner, that the measuring fields 20, 24 are separated from or arranged at a distance from the rotatable device 14 in the above-described manner is a consequence of the circumstance that by providing of the beam splitter 26 and the first and second partial beams 44, 46 provided by it, a laser light detection device 16 is offered, which enables an alignment determination similar to that of a known arrangement, e.g., from DE 39 11 307 A1, in which the two measuring fields 20, 24 are arranged in succession along a line on the rotatable device which is parallel to the axis of rotation. Due to the laser light detection device 16 a measurement layout can be realized (see FIG. 2) in which the two measuring fields 20, 24 are arranged virtually/v in succession along the axis of rotation 12 at the device 14.

A method for determining the alignment of a laser light beam 10 referred to the device in the form of a roll (see FIG. 1A) which can rotate about the axis of rotation 12 by means of the laser light detection device 16 comprises the following steps:

(A) Rotationally fixed connecting of the laser light detection device 16 to the device 14, wherein the laser light detection device 16 is connected to the device 14 in a rotationally fixed manner, such that the first measuring field 20 is arranged at a distance or spaced from the device 14 along the axis of rotation 12, such that the second measuring field 24 is arranged at a distance or spaced from the device 14 along a line parallel to the angle of rotation 12, and such that the X1 coordinate axis 30 and the Y1 coordinate axis 32 of the first measuring field 20 are aligned essentially perpendicular to the axis of rotation 12 of the device 14.

(B) Irradiating of the entry surface 40 of the beam splitter 26 with the laser light beam 10, wherein during the irradiating of the entry surface 40 the device 14 is rotated, starting from a predetermined initial rotational position 50, in a predetermined direction of rotation 51 (see FIG. 1C) through a predetermined angular dimension amounting to 90 degrees about the axis of rotation 12.

Figure 4:
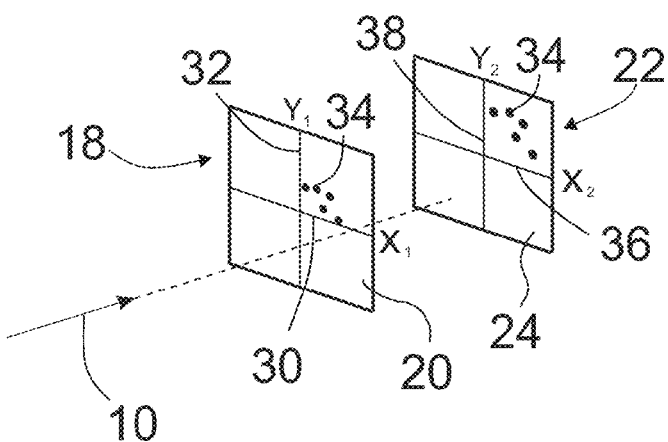

(C) Detecting the X1 coordinates and Y1 coordinates of the laser light spot 34 of the first partial beam 44 on the first measuring field 20 and the X2 coordinates and Y2 coordinates of the laser light spot 34 of the second partial beam 46 on the second measuring field 24 (see also FIG. 4) in five different rotational positions of the device 14, these positions being assumed during the rotation according to step B, and detecting the angle of rotation α by which the device 14 is turned in each of the different rotational positions compared to the initial rotational position 50, and (D) Determining the alignment of the laser light beam 10 referred to the axis of rotation 12 of the device 14 on the basis of the angle of rotation α detected for each rotational position and the Y1 coordinates and Y2 coordinates detected.

Figure 5:
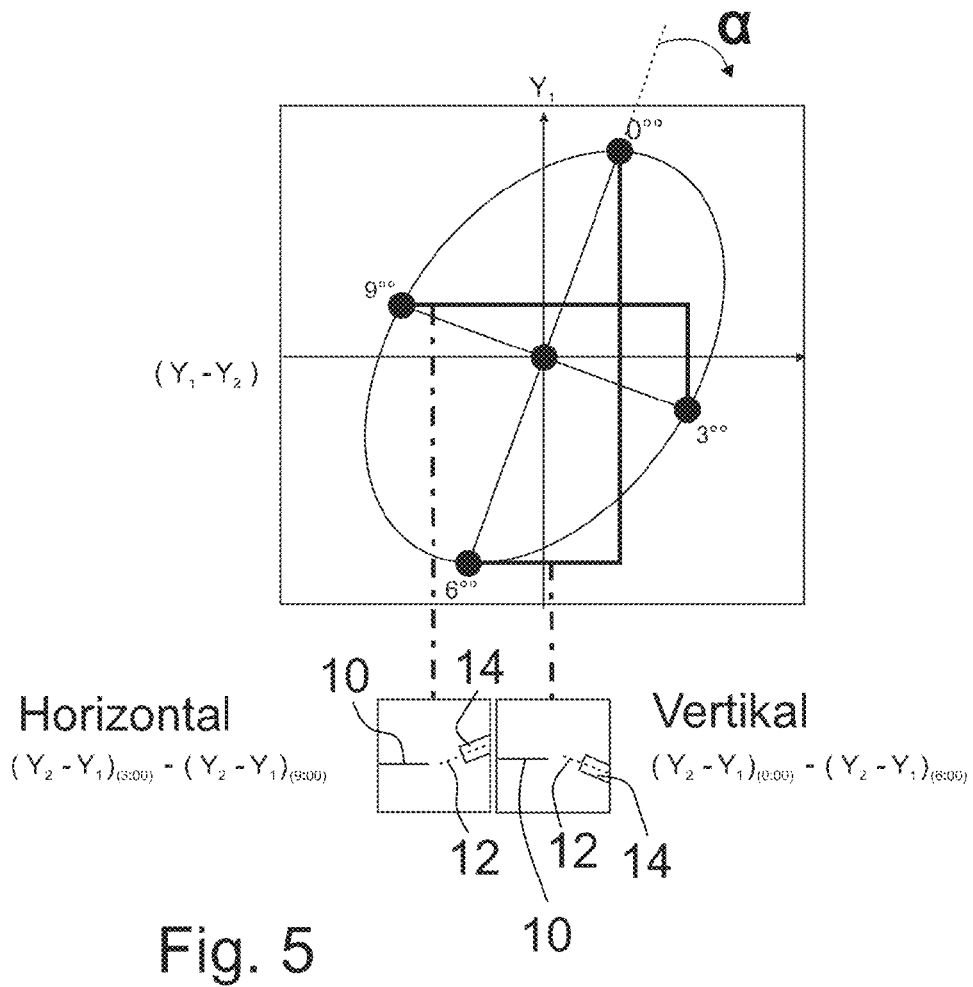

In step D the alignment of the laser light beam 10 is determined referred to the axis of rotation 12 of the device 10 on the basis of the angles of rotation α detected for each rotational position and the detected Y1 coordinates and Y2 coordinates, wherein the Y1 coordinates are plotted as a function of the measured angle of rotation α against the difference Y1-Y2 formed from the Y1 coordinates and Y2 coordinates—which is likewise represented as a function of the measured angle of rotation α—and a closed trajectory in the form of an ellipse is determined by curve fitting to the plotted coordinates (see FIG. 5). By means of this trajectory, the alignment of the laser light beam 10 referred to the axis of rotation 12 can then be easily determined or read off in the form of any existing horizontal and/or vertical angle offset in the manner illustrated in FIG. 5. The basis of this process is formed by the differences Y2-Y1 on the trajectory in the so-called 0 o'clock (0:00) position, the 3 o'clock (3:00) position, the 6 o'clock (6:00) position and the 9 o'clock (9:00) position, these positions being in fact the angles α measured by the measurement instrument 86 in the amount of 0 degrees, 90 degrees, 180 degrees and 270 degrees in relation to the direction of the center of gravity.

FIG. 3 shows a schematic three-dimensional representation of another exemplary embodiment of a laser light detection device 16 together with two rotatable or turnable devices 14 in the form of rolls, which are contained in a receiver 99, where the laser light detection device 16 is shown in a state in which it is connected to the right-hand rotatable device in a rotationally fixed manner in the way defined according to step A of the method of the invention.

The laser light detection device 16 of FIG. 3 is distinguished in that the laser light detection device 16, in order to produce a connection to the device 14 in a rotationally fixed manner has a holding device 54 with at least one magnetic holding means 56, so that the laser light detection device 16 can be connected in a rotationally fixed manner by bringing the holding means 56 into contact with the covering surface area 52 of the device 14 by magnetic force, for which the device 14 here is magnetic on the covering surface area 52.

The laser light detection device 16 of FIG. 3 comprises a housing 104, in which the two measuring fields and the beam splitter are arranged, the housing 104 having a maximum dimension of around 100 mm.

Figure 6A:
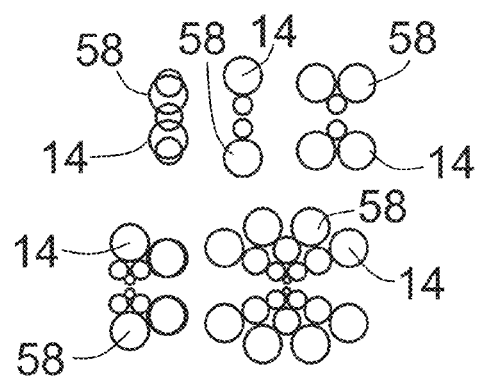
Figure 6B:
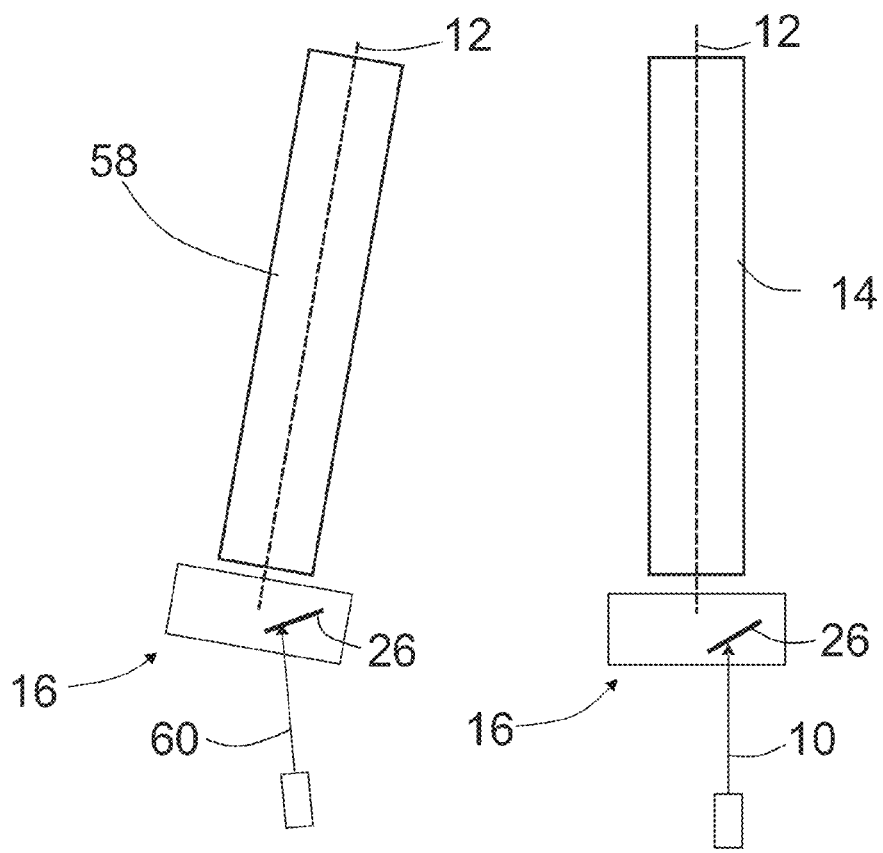

FIG. 6B serves to illustrate a method for determining the alignment of the axes of rotation 12 of two devices 14 and 58 in the form of rolls in relation to each other, being spaced apart and each able to rotate about an axis of rotation 12. The following described method is, of course, not confined to two rotatable or turnable devices and can be used in particular for determining the alignments of a plurality of rolls to each other, such as are used e.g. in typical rolling mills (see FIG. 6A).

The method comprises the following steps:

(I) Determining the alignment of the axis of rotation 12 of a first device 14 referred to a first laser light beam 10 by means of an above method making use of the laser light detection device 16 (here shown only highly schematically, wherein, moreover, FIG. 6B illustrates a state in which the laser light detection device 16 has been connected to the particular device 14, 58 in a rotationally fixed way in the manner defined in step A), (II) Providing at least one second laser light beam 60, wherein the position of the second laser light beam 60 differs from that of the first laser light beam 10, (III) Determining the alignment of the axis of rotation 12 of the second device 58 referred to the second laser light beam 60 by means of an above method making use of the laser light detection device 16, (IV) Determining the alignment of the second laser light beam 60 in relation to the first laser light beam 10, and (V) Determining the alignment of the axis of rotation 12 of the second device 58 referred to the first laser light beam 10 on the basis of the alignment determined in step (IV) and the alignment determined in step (III) and determining the alignment of the axis of rotation 12 of the first device 14 referred to the axis of rotation 12 of the second device 58 on the basis of the determined alignment of the axis of rotation 12 of the second device 58 referred to the first laser light beam 10 and the alignment determined in step I.

Figure 7A:
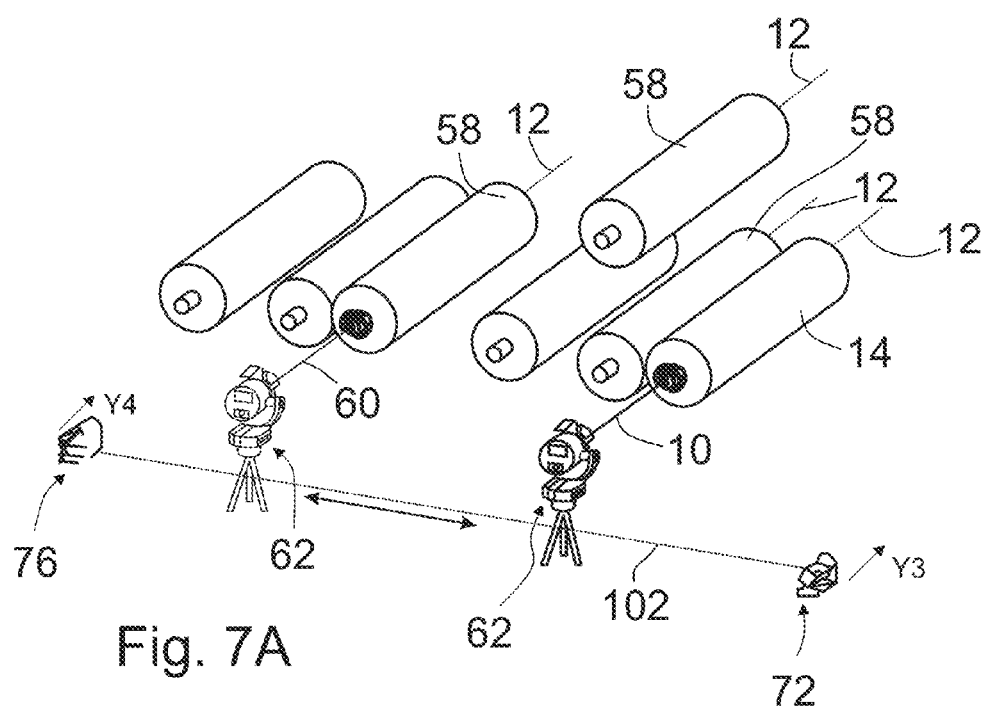

In another exemplary embodiment of the method according to the invention for determining the alignment of the axes of rotation of a plurality of devices 14, 58 in the form of rotatable rolls in relation to each other (see FIG. 7A), which is described below, the first laser light beam 10 and several second laser light beams 60 are generated by the same laser light source 62, wherein the position of the laser light source 62 is changed in order to provide the laser light beams 10 and 60 of differing position, as illustrated in FIG. 7A.

In the method, the laser light source 62 splits a horizontally aligned laser light base beam (not shown) in a known way into a horizontally aligned partial beam 66 and another partial beam 68 (see FIG. 7B), which is aligned perpendicular to the horizontally aligned partial beam 66.

The laser light source 62, moreover, is designed to rotate the additional partial beam 68 in a vertically extending plane 70. The first laser light beam 10 and the second laser light beam 60 whose alignment to the rolls 14 and 58 is determined according to the method are each one of these horizontally aligned partial beams 66, or the laser light beams 10, 60 are identical to these partial beams 66 of the laser light source 62.

Figure 7B:
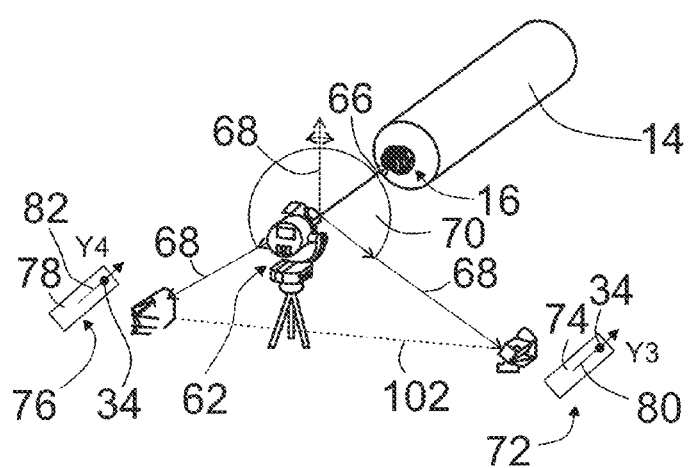

Before step I, a third laser light sensor 72 with a third planar measuring field 74 and a fourth laser light sensor 76 with a fourth planar measuring field 78 with a predetermined spacing of the measuring fields 74, 78 from each other are arranged in predetermined positions (see FIGS. 7A and 7B for illustration of the measuring fields 74 and 78 provided at the laser light sensors 72 and 76, these fields being shown somewhat enlarged next to the laser light sensors 72 and 76).

The third measuring field 74 has a Y3 coordinate axis 80 and the fourth measuring field 78 has a Y4 coordinate axis 82. The third and the fourth measuring fields 74, 78 are arranged in the predetermined positions such that the Y3 coordinate axis 80 and Y4 coordinate axis 82 are parallel to each other and extend horizontally. The positions of the third and fourth measuring fields 74, 78 are chosen such that the additional partial beam 68 rotatable in the vertical plane 70 in steps I and III can impinge upon the third and the fourth measuring fields 74, 78.

In step IV, for determining the alignment of each of the second laser light beams 60 in relation to the first laser light beam 10 in steps I and III, the Y3 coordinate of at least one laser light spot 34 of at least one additional partial beam 68 impinging on the third measuring field 74 is additionally detected by the third laser light sensor 72, and the Y4 coordinate of at least one laser light spot 34 of at least one additional partial beam 68 impinging on the fourth measuring field 78 is detected by the fourth laser light sensor 78 and on the basis of the respective Y3 coordinate and Y4 coordinate, the alignment of every second laser light beam 60 in relation to the first laser light beam 10 is determined.

Figure 7C:
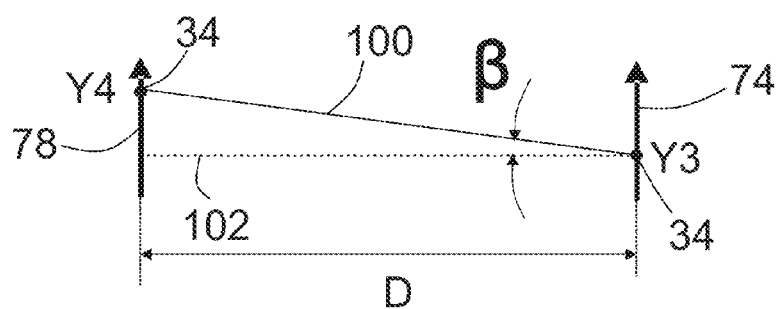

Since the distance of the third measuring field 74 from the fourth measuring field 78 is known as a given spacing (see FIG. 7C) and the additional partial beam 68 is perpendicular to the first or second laser light beam 10, 60 produced in the form of the horizontally aligned partial beam 66, the alignment of each second laser light beam 60 in relation to the first laser light beam 10 can be determined on the basis of simple geometrical relations, e.g., also via the tangent function. For this, in every position adopted by the laser light source 62 during the method, only the difference Y3-Y4 is placed in a ratio to the distance D in order to determine the angle 11 on the basis of the tangent function (see FIG. 7C) by which a connection line 100 joining the laser light spot 34 on the third measuring field 74 to the laser light spot 34 on the fourth measuring field 78 is inclined compared to a scribe line 102 (see also FIGS. 7A and 7B), along which the measuring fields 74 and 78 are arranged consecutively to each other with the predetermined spacing D. This determination is carried out in steps I and III for the first laser light beam 10 and every second laser light beam 60 or for every position adopted by the laser light source 62 during the method, and on the basis of the determined angle of inclination 11, the alignment of each of the second laser light beams 60 in relation to the first laser light beam 10 can be determined. This is easily possible, since the scribe line 102 is a spatially fixed reference line, so that on the basis of the angle of inclination β, to this reference line, one can also directly determine or ascertain the alignment of every second laser light beam 60 in relation to the first laser light beam 10.

LIST OF REFERENCE NUMBERS

10 laser light beam
12 axis of rotation
14 device
16 laser light detection device
18 first laser light sensor
20 first planar measuring field
22 second laser light sensor
24 second planar measuring field
26 beam splitter
28 coordinate system
30 X1 coordinate axis
32 Y1 coordinate axis
34 laser light spot
36 X2 coordinate axis
38 Y2 coordinate axis
40 entry surface
42 exit surface 44 first partial beam
46 second partial beam
48 optical path
50 initial rotational position
51 direction of rotation
52 covering surface area
54 holding device
56 holding means
58 device
60 laser light beam
62 laser light source
66 horizontal partial beam
68 additional partial beam
70 vertical plane
72 third laser light sensor
74 third planar measuring field
76 fourth laser light sensor
78 fourth planar measuring field
80 Y3 coordinate axis
82 Y4 coordinate axis
84 evaluation unit
86 measurement instrument
96 lens
98 mirror
99 receiver
100 connection line
102 scribe line
104 housing

The invention claimed is:

1. A method for determining the alignment of a laser light beam referred to an axis of rotation of a device that is rotatable around the axis of rotation, wherein the alignment is ascertained by means of a laser light detection device,
wherein the laser light detection device comprises a first laser light sensor with a first planar measuring field, a second laser light sensor with a second planar measuring field, and a beam splitter,
wherein the first measuring field has a coordinate system with an X1 coordinate axis and a Y1 coordinate axis perpendicular to the X1 coordinate axis, wherein the first laser light sensor is disposed to detect on the first measuring field the X1 coordinate and Y1 coordinate of a laser light spot of a laser light beam impinging on the first measuring field,
wherein the second measuring field has a coordinate system with an X2 coordinate axis and a Y2 coordinate axis perpendicular to the X2 coordinate axis, wherein the second laser light sensor is disposed to detect on the second measuring field the X2 coordinate and Y2 coordinate of a laser light spot of a laser light beam impinging on the second measuring field,
Wherein at least one coordinate axis selected from the group of coordinate axes consisting of: the Y2 coordinate axis of the second measuring field and the X2 coordinate axis of the second measuring field, is aligned parallel to the respective Y1 or X1 coordinate axis of the first measuring field,
wherein the beam splitter has a planar entry surface and an exit surface parallel to this, wherein the entry surface is aligned parallel to the Y1 coordinate axis or X1 coordinate axis,
wherein the beam splitter splits a laser light beam impinging on the planar entry surface into a first partial beam, which passes through the beam splitter, and a second partial beam produced by reflection of a part of the laser light beam on the entry surface,
wherein the optical path of the first partial beam and of the second partial beam emerging from the beam splitter are configured such that the first partial beam impinges on the first measuring field and the second partial beam impinges on the second measuring field and such that the optical path of the first partial beam up to the first measuring field is shorter than the optical path of the second partial beam up to the second measuring field,
wherein the method comprises the following steps:
(A) Rotationally fixed connecting of the laser light detection device to the device, wherein the laser light detection device is connected in a rotationally fixed manner to the device such that the first measuring field is arranged at a distance from the device along the axis of rotation or along a line parallel to this, such that the second measuring field is arranged at a distance from the device along the axis of rotation or along a line parallel to this, and such that the X1 coordinate axis and the Y1 coordinate axis of the first measuring field are aligned essentially perpendicular to the axis of rotation of the device,
(B) Irradiating of the entry surface of the beam splitter with the laser light beam, wherein during the irradiating of the entry surface the device is rotated, starting from a predetermined initial rotational position, in a predetermined direction of rotation through a predetermined angular dimension,
(C) Detecting the X1 coordinates and Y1 coordinates of the laser light spot of the first partial beam on the first measuring field and the X2 coordinates and Y2 coordinates of the laser light spot of the second partial beam on the second measuring field in at least five different rotational positions of the device, these positions being assured during the rotation according to step (B), and detecting the angle of rotation by which the device is turned in each of the different rotational positions compared to the initial rotational position, and
(D) Determining the alignment of the laser light beam referred to the axis of rotation of the device on the basis of the angle of rotation detected for each rotational position and the Y1 coordinates and Y2 coordinates detected, or on the basis of the angle of rotation detected for each rotational position and the X1 coordinates and X2 coordinates detected.

2. The method according to claim 1, further characterized in that the device is a roll or a shaft, wherein the roll or the shaft has a threaded borehole at one end face, and wherein a screw connection between the laser light detection device and the roll or the shaft is produced for the rotationally fixed connection according to step (A) via the threaded borehole.

3. The method according to claim 1, further characterized in that the device is a roll or a shaft, wherein the roll or the shaft is magnetic at least in regions at least on the covering surface area, wherein the laser light detection device has a holding device with at least one magnetically configured holding means for the rotationally fixed connection according to step (A), and the holding device is connected in a rotationally fixed manner, by magnetic force by bringing the holding means into contact with the covering surface area of the roll or shaft.

4. A method for determining the alignment of the axes of rotation of a plurality of devices relative to each other, being spaced apart and each able to rotate about an axis of rotation, wherein the method comprises the following steps:
(I) Determining the alignment of the axis of rotation of a first device referred to a first laser light beam by means of a method according to claim 1, (II) Providing at least one second laser light beam, wherein the position of the second laser light beam differs from that of the first laser light beam, (III) Determining the alignment of the axis of rotation of at least one second device referred to the second laser light beam by means of a method according to claim 1, (IV) Determining the alignment of the second laser light beam relative to the first laser light beam, and (V) Determining the alignment of the axis of rotation of the second device referred to the first laser light beam on the basis of the alignment determined in step (IV) and the alignment determined in step (III) and determining the alignment of the axis of rotation of the first device referred to the axis of rotation of the second device on the basis of the determined alignment of the axis of rotation of the second device referred to the first laser light beam and the alignment determined in step (I).

5. The method according to claim 4, further characterized in that the first and the second laser light beams are generated by the same laser light source, wherein at least one property of the laser light source selected from the group of properties consisting of: the position of the laser light source and the emission direction of the laser light source, is changed to provide the laser light beams with position differing from each other.

6. The method according to claim 5, further characterized in that the laser light source divides a horizontally aligned laser light base beam into a horizontally aligned partial beam and another partial beam that is aligned perpendicular to the horizontally aligned partial beam wherein the laser light source moreover is designed to rotate the additional partial beam in a vertically extending plane, wherein the first laser light beam and the second laser light beam are horizontally aligned partial beams of the laser light source, wherein before step (I) a third laser light sensor with a third planar measuring field and a fourth laser light sensor with a fourth planar measuring field with a predetermined spacing of the measuring fields from each other are arranged in predetermined positions, wherein the third measuring field has a Y3 coordinate axis and the fourth measuring field a Y4 coordinate axis, wherein the third and the fourth measuring fields are arranged in the predetermined positions such that the Y3 coordinate axis and Y4 coordinate axis are parallel to each other and extend horizontally, wherein the positions of the third and fourth measuring fields are moreover chosen such that the additional partial beam rotatable in the vertical plane in steps (I) and (III) can impinge upon the third and the fourth measuring fields, and wherein in step (IV), for determining the alignment of the second laser light beam relative to the first laser light beam in steps (I) and (III), the Y3 coordinates and Y4 coordinates of at least one laser light spot of the additional partial beam impinging on the third and fourth measuring fields are additionally detected and on this basis the alignment of the second laser light beam relative to the first laser light beam is determined.

7. A laser light detection device for determining the alignment of a laser light beam referred to an axis of rotation of a device that is rotatable around the axis of rotation, wherein the laser light detection device comprises a first laser light sensor with a first planar measuring field, a second laser light sensor with a second planar measuring field, and a beam splitter, wherein the first measuring field has a coordinate system with an X1 coordinate axis and a Y1 coordinate axis perpendicular to the X1 coordinate axis, wherein the first laser light sensor is disposed to detect on the first measuring field the X1 coordinate and Y1 coordinate of a laser light spot of a laser light beam impinging on the first measuring field, wherein the second measuring field has a coordinate system with an X2 coordinate axis and a Y2 coordinate axis perpendicular to the X2 coordinate axis, wherein the second laser light sensor is disposed to detect on the second measuring field the X2 coordinate and Y2 coordinate of a laser light spot of a laser light beam impinging on the second measuring field, wherein at least one coordinate axis selected from the group of coordinate axes consisting of: the Y2 coordinate axis of the second measuring field and the X2 coordinate axis of the second measuring field, is aligned parallel to the respective Y1 or X1 coordinate axis of the first measuring field, wherein the beam splitter has a planar entry surface and an exit surface parallel to this, wherein the entry surface is aligned parallel to the Y1 coordinate axis or X1 coordinate axis, wherein the beam splitter splits a laser light beam impinging on the planar entry surface into a first partial beam, which passes through the beam splitter, and a second partial beam produced by reflection of a part of the laser light beam on the entry surface, wherein the optical path of the first partial beam and of the second partial beam emerging from the beam splitter are configured such that the first partial beam impinges on the first measuring field and the second partial beam impinges on the second measuring field, such that the optical path of the first partial beam up to the first measuring field is shorter than the optical path of the second partial beam up to the second measuring field, wherein the laser light detection device is connected to the device in a rotationally fixed manner such that the first measuring field is arranged at a distance from the device along the axis of rotation or along a line parallel to this, such that the second measuring field is arranged at a distance from the device along the axis of rotation or along a line parallel to this, and such that the X1 coordinate axis and the Y1 coordinate axis of the first measuring field are aligned essentially perpendicular to the axis of rotation of the device, wherein the laser light detection device moreover has an evaluation unit and a measurement instrument for measuring an angle of rotation, wherein the evaluation unit is designed to determine the alignment of the laser light beam referred to the axis of rotation of the device on the basis of Y1 coordinates and Y2 coordinates or X1 coordinates and X2 coordinates of the laser light spot of the first and second partial beams, which are detected by the first laser light sensor and the second laser light sensor upon rotating of the device in a predetermined direction of rotation through a predetermined angular dimension in at least five different rotational positions of the device, and on the basis of the angles of rotation by which the device is rotated in each of the different rotational positions compared to an initial rotational position, these angles being measurable by the measurement instrument.

8. The laser light detection device according to claim 7, further characterized in that in order to produce a rotationally fixed connection to a device configured as a shaft or a roll, the laser light detection device is designed to produce a screw connection between the laser light detection device and the device via a threaded borehole, which is provided at one end face of the device.

9. The laser light detection device according to claim 7, further characterized in that in order to produce a rotationally fixed connection to the device, the laser light detection device has a holding device with at least one magnetically configured holding means, so that the laser light detection device can be connected in a rotationally fixed manner by magnetic force by bringing the holding means into contact with the covering surface area of a device configured as a roll or a shaft, when the device rotatable about the axis of rotation is magnetic at least in regions on the covering surface area.

* * * * *